United States Patent [19]
Gall et al.

[11] Patent Number: 5,379,545
[45] Date of Patent: Jan. 10, 1995

[54] ANIMAL REPELLENT DEVICE

[76] Inventors: Bela Gall; John Gall, both of 1801 Coral Ridge Dr., Fort Lauderdale, Fla. 33305

[21] Appl. No.: 175,508

[22] Filed: Dec. 30, 1993

Related U.S. Application Data

[63] Continuation-in-part of Ser. No. 38,242, Mar. 29, 1993, abandoned.

[51] Int. Cl.6 ............................................. A01M 25/00
[52] U.S. Cl. ........................................ 43/131; 239/57
[58] Field of Search .............. 43/121, 124, 131, 132.1; 239/57, 59

[56] References Cited

U.S. PATENT DOCUMENTS

| | | | |
|---|---|---|---|
| 958,678 | 5/1910 | Pollard | 43/132.1 |
| 1,729,389 | 9/1929 | Hughett | 43/121 |
| 2,837,861 | 6/1958 | Graham, Sr. | 43/131 |
| 4,065,872 | 1/1978 | Patton et al. | 43/131 |
| 4,194,690 | 3/1980 | Stever et al. | 43/131 |
| 4,969,599 | 11/1990 | Campbell | 43/1 |

*Primary Examiner*—Kurt Rowan
*Assistant Examiner*—Jeanne M. Elpel
*Attorney, Agent, or Firm*—Joseph Zallen

[57] ABSTRACT

A device for diffusing chemical animal repellent, comprising a container having a ground engaging pin, a sloping cover, and orifices permitting diffusion of chemical animal repellent in the container to the outside atmosphere.

2 Claims, 4 Drawing Sheets

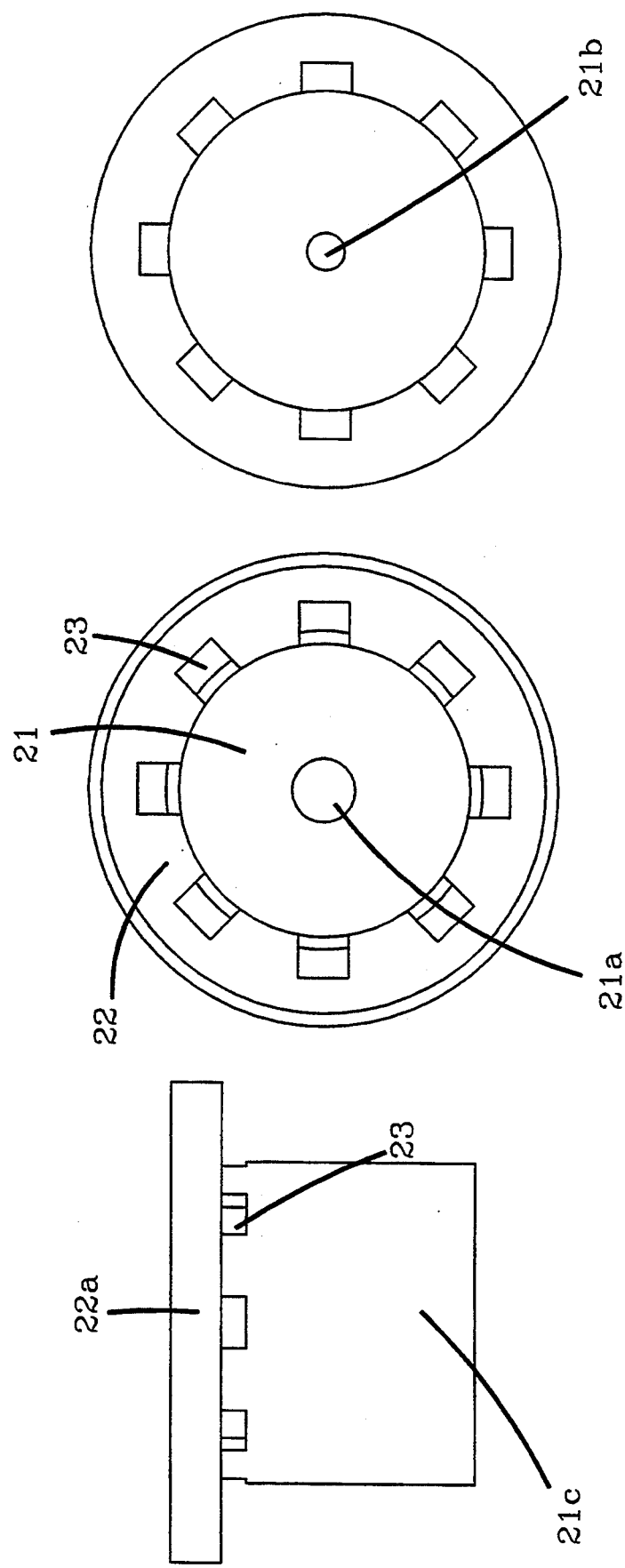

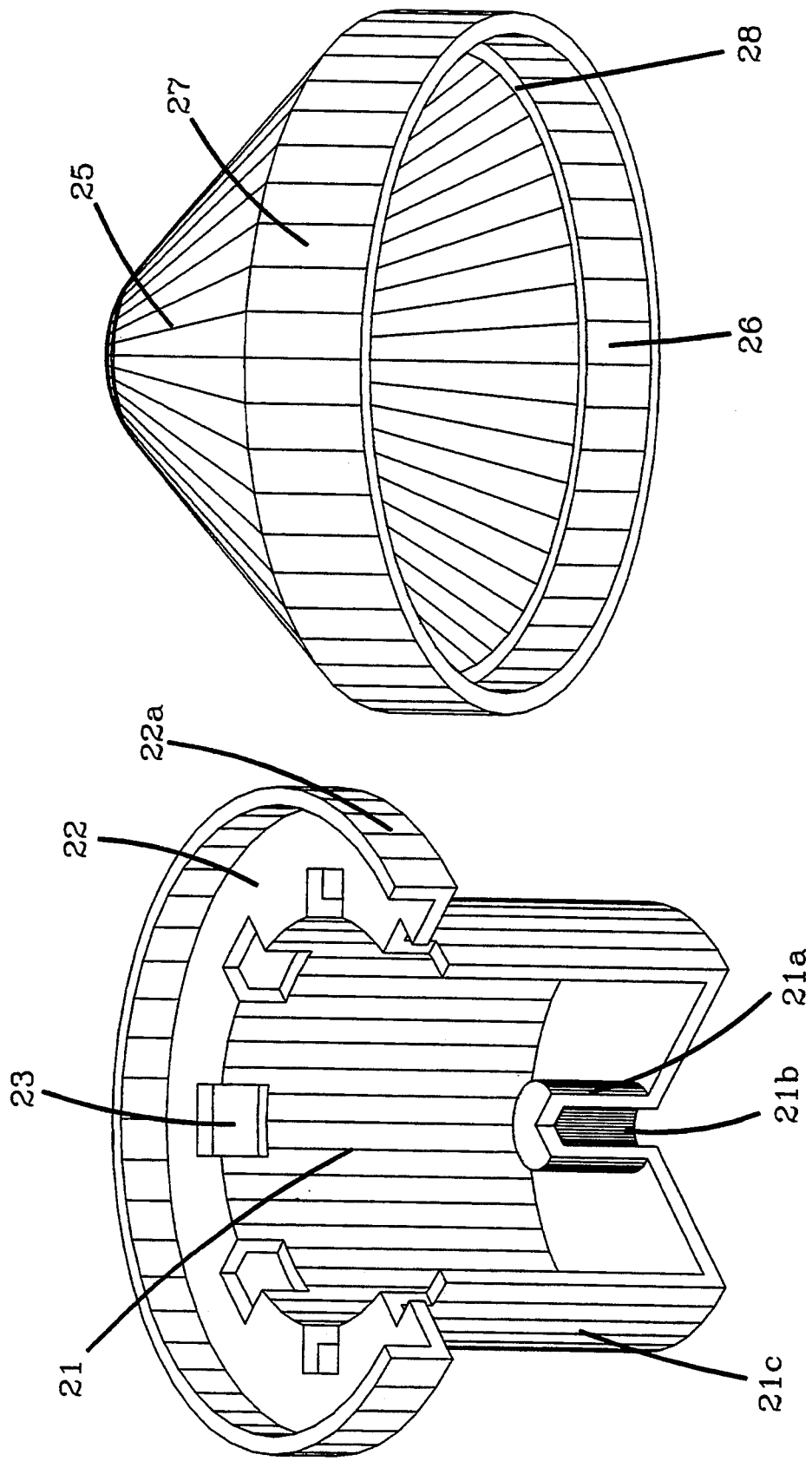

ANIMAL REPELLENT DEVICE

This is a continuation-in-part of application Ser. No. 08/038,242, filed Mar. 29, 1993 now abandoned, which is incorporated herein by reference.

BACKGROUND OF INVENTION

This invention relates to an improvement in utilizing chemical animal repellents.

Chemical animal repellents are powders which contain volatile ingredients offensive to animals such as dogs, cats, wolves, gophers, raccoons, squirrels, rabbits, and deer. Such repellents are used to prevent damage caused by browsing of such animals among trees, shrubs, gardens, vines, and lawns. The present method of utilizing the repellents is to treat ground cover with the powder. Lawns can be treated directly, but powders are not directly applied to sensitive growth such as plants, flowers, and foliage, and may not be used on fruit or nut-bearing trees or in or around poultry houses. However, the effectiveness of such repellents diminishes rapidly, particularly in wet weather.

One object of the present invention is to provide a device which will substantially increase the time that a chemical repellent is effective. A further object of this invention is to protect against toxicity to animals and plants.

Other objects and advantages will be apparent from the disclosure and claims which follow taken together with the appended drawings.

BRIEF DESCRIPTION OF DRAWINGS

FIG. 4 is a side view of a second embodiment of this invention as assembled.

FIG. 5 is a top view of the portion of the second embodiment chamber.

FIG. 6 is a bottom view of the chamber portion of the second embodiment.

FIG. 7 is a partial perspective cut-away view of the chamber portion of the second embodiment.

FIG. 8 is a perspective view of the cover portion of the second embodiment.

SUMMARY OF INVENTION

This invention comprises broadly a container for holding chemical animal repellent which has openings for communicating with the outside air and means for protecting the repellent from rain or snow. In one preferred form of this invention the container is closed at the bottom, has a pin for inserting into the ground, has slots for communicating with the outside air, and a cover member.

The devices of this invention can be fabricated from a wide variety of materials such as plastic and have a color to blend with or contrast with the color of the grass.

SPECIFIC EXAMPLE OF INVENTION

Figure 1:
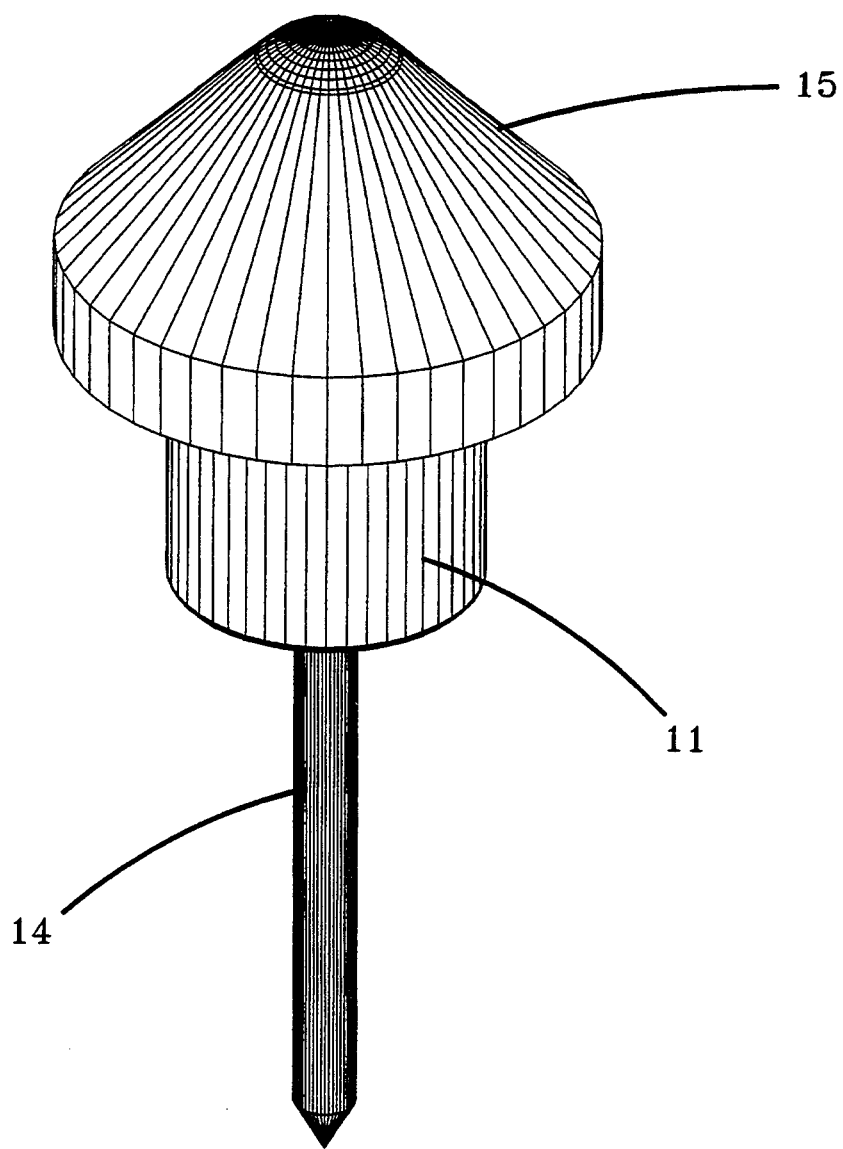
FIG. 1 is a front perspective view of a first embodiment of this invention.
Figure 3:
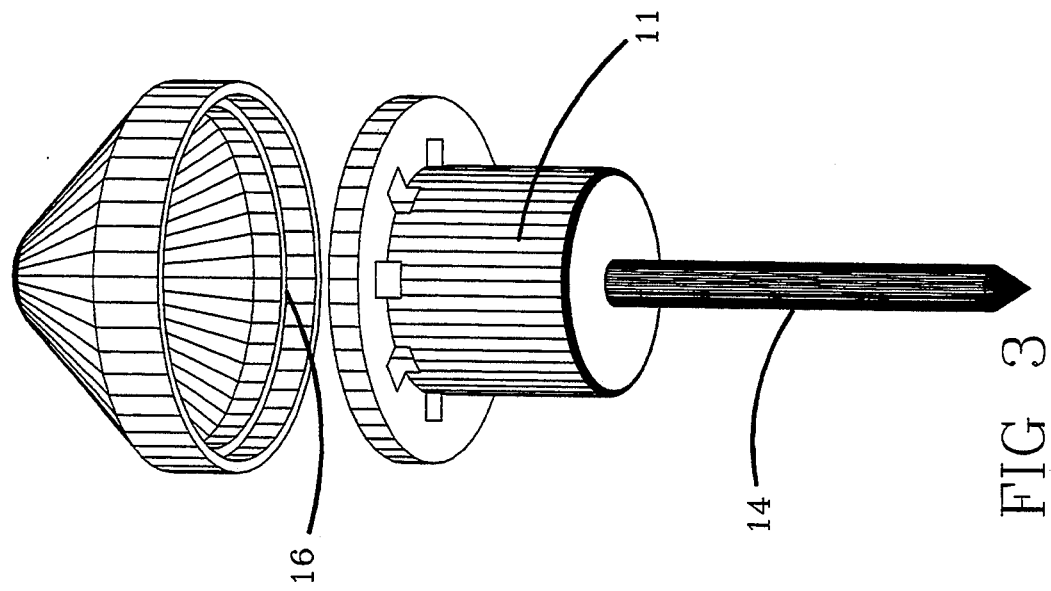
FIG. 3 is a partially exploded view tilted backward of the first embodiment.
Figure 2:
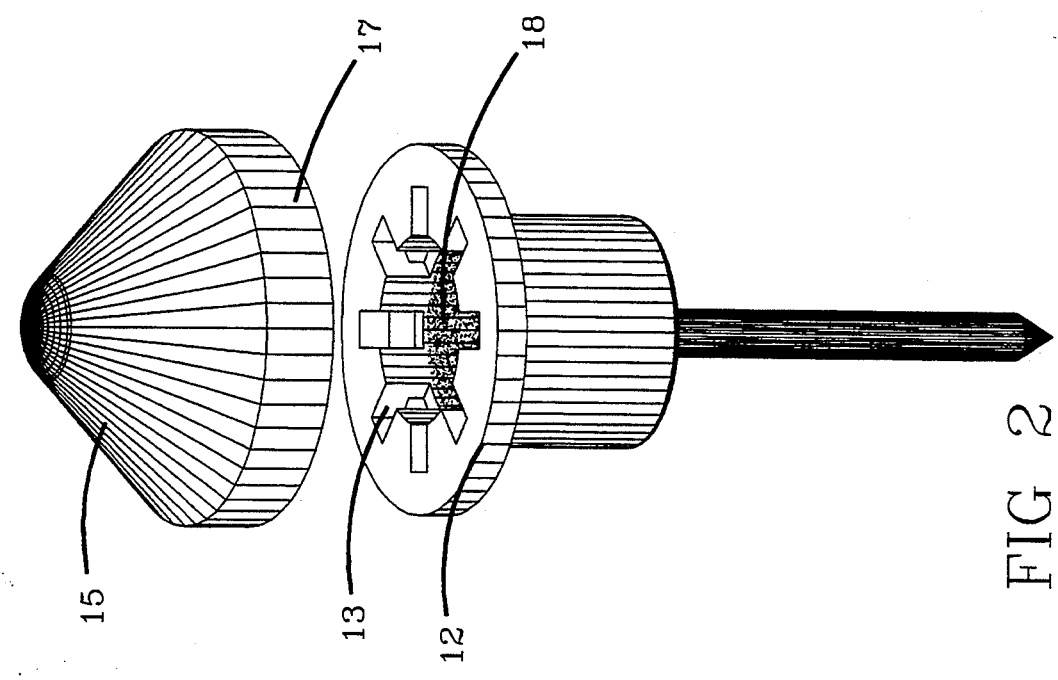
FIG. 2 is a partially exploded perspective view tilted forward of the first embodiment.

Referring now to FIGS. 1-3 of the drawings, the container 11 has a chamber 18 open at the top with eight spaced orifices 13 in its side wall and a top outwardly extending rim 12. Attached to the base of container 11 is a support pin 14 for insertion into the ground. A cover 15 is provided which is downwardly flared and has a flange 17 which fits over rim 12 and extends over the orifices 13.

Referring now to the second embodiment illustrated in FIGS. 4-8, the vertical chamber 21 is open at its top and closed at its bottom. At its top is a peripheral shelf 22 bounded by a vertical wall 22a. There are an array of cut-out portions which are partially in the shelf 22 and partially in the wall 21c of the vertical chamber 21. At the bottom of the chamber 21 is an inverted pocket 21a having an opening 21b to accommodate a pin for insertion into the groove. The cover 25 has a peripheral vertical wall 27 which fits over chamber wall 22a and a ledge 28 which fits on the top of wall 22a.

In use, chemical animal repellent, typically dry granules, is placed in chamber 18, the cover 15 placed into position, and the entire device pressed down by its pin 14 so as to sit on the ground.

The normal currents of air cause the odor from the repellent to diffuse out of the opening 13 to the surrounding area and thus act as a deterrent for the particular area around the device. Four ounces of a typical commercial chemical animal repellent normally lasts about 3-4 weeks before replacement is required. Typical dimensions of the device would be a height of about 4-5 inches, a width of about 4-5 inches, and a pin length of about 6 inches. Suitable spacing of such devices would be to have them about 30 feet apart.

We claim:

1. A device for applying chemical animal repellent comprising in combination: a body portion (11) and a cover portion (15); said body portion (11) having an upper outwardly extending rim (12), an inner chamber (18), and a plurality of orifices (13) in said rim (12) and said body portion (11); said cover (15) having a flange (17) which seats over said rim (12); a ground-engaging means (14) being attached to the bottom of said body portion (11); the device being so characterized that when animal repellent is placed in said chamber (18), the combination of the cover (15) and body portion (11) protects the interior of chamber (18) from rain but said orifices (13) permit connection between the interior of the chamber (18) and the outside atmosphere so that any volatile ingredients in the chamber (18) may diffuse into the atmosphere; said orifices (13) extending vertically through rim (12).

2. The device of claim 1 wherein the orifices (13) also extend horizontally through the body portion (11) into the chamber (18) adjacent the rim (12).

* * * * *